(12) United States Patent
Nuggehalli et al.

(10) Patent No.: US 11,023,186 B2
(45) Date of Patent: Jun. 1, 2021

(54) SECURE MOBILE CLOUD PRINTING USING PRINTING DEVICE GROUPS

(71) Applicants: Jayasimha Nuggehalli, Sunnyvale, CA (US); Kaoru Watanabe, Sunnyvale, CA (US)

(72) Inventors: Jayasimha Nuggehalli, Sunnyvale, CA (US); Kaoru Watanabe, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/573,784

(22) Filed: Sep. 17, 2019

(65) Prior Publication Data

US 2021/0081153 A1    Mar. 18, 2021

(51) Int. Cl.
*G06F 3/12* (2006.01)

(52) U.S. Cl.
CPC ............ *G06F 3/1238* (2013.01); *G06F 3/126* (2013.01); *G06F 3/1222* (2013.01); *G06F 3/1288* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 8,891,106 B1 | 11/2014 | Haapanen | |
| 9,203,822 B2 | 12/2015 | Ono | |
| 9,516,473 B1 | 12/2016 | Haapanen | |
| 10,423,798 B2 | 9/2019 | Claibone | |
| 10,430,125 B1 | 10/2019 | Sherman | |
| 2002/0140972 A1 | 10/2002 | Onishi | |
| 2006/0080525 A1 | 4/2006 | Ritter | |
| 2008/0055627 A1* | 3/2008 | Ellis | G06F 3/1288 358/1.14 |
| 2010/0277756 A1* | 11/2010 | Merriam | G06F 3/1203 358/1.15 |
| 2012/0266073 A1 | 10/2012 | Tanaka | |
| 2013/0145420 A1 | 6/2013 | Ting | |
| 2013/0227664 A1 | 8/2013 | McKay | |

(Continued)

OTHER PUBLICATIONS

Haapanen, U.S. Appl. No. 16/354,872, filed Mar. 15, 2019, Office Action dated Jan. 8, 2020.

(Continued)

*Primary Examiner* — Andrew H Lam
(74) *Attorney, Agent, or Firm* — Hickman Becker Bingham Ledesma LLP; Edward A. Becker (57) ABSTRACT

A mobile device generates and transmits to a print cloud server application via email, a print cloud request that specifies information to be printed. The print cloud server application generates and assigns a print job to a printing device group that corresponds to the destination email address of the print cloud request and generates and returns a release code to the mobile device. A user enters the release code at a printing device and the printing device generates and transmits, to the print cloud server application, a request for a print job. The request for a print job includes the release code and data that identifies the printing device group to which the printing device belongs. The print cloud server application releases the print job to the printing device if the printing device and the print job correspond to the same printing device group.

20 Claims, 7 Drawing Sheets

(56) References Cited

U.S. PATENT DOCUMENTS

| | | |
|---|---|---|
| 2014/0009783 A1 | 1/2014 | Chakirov |
| 2014/0070002 A1 | 3/2014 | Pineau |
| 2014/0293325 A1 | 10/2014 | Haapanen |
| 2014/0355069 A1 | 12/2014 | Caton |
| 2015/0009523 A1 | 1/2015 | Jeran |
| 2015/0092233 A1 | 4/2015 | Park |
| 2015/0154484 A1 | 6/2015 | Iwasaki |
| 2015/0161723 A1 | 6/2015 | Rose |
| 2015/0169266 A1 | 6/2015 | Iwasaki |
| 2015/0281227 A1 | 10/2015 | Fox Ivey |
| 2015/0295898 A1 | 10/2015 | Tredoux |
| 2016/0065781 A1 | 3/2016 | Um |
| 2016/0150124 A1 | 5/2016 | Panda |
| 2016/0179449 A1 | 6/2016 | Cho |
| 2016/0182762 A1 | 6/2016 | Eum |
| 2016/0253127 A1 | 9/2016 | Panda |
| 2016/0277597 A1 | 9/2016 | Ohara |
| 2016/0299728 A1 | 10/2016 | Li |
| 2016/0366240 A1 | 12/2016 | Haapanen |
| 2017/0126671 A1 | 5/2017 | Haapanen |
| 2017/0149873 A1 | 5/2017 | Jang |
| 2017/0230536 A1 | 8/2017 | Haapanen |
| 2017/0289364 A1 | 10/2017 | Haapanen |
| 2017/0289750 A1 | 10/2017 | Haapanen |
| 2017/0316217 A1 | 11/2017 | Smith |
| 2017/0344325 A1 | 11/2017 | Osadchyy |
| 2018/0060595 A1 | 3/2018 | Olds |
| 2018/0067705 A1 | 3/2018 | Masui |
| 2018/0095704 A1 | 4/2018 | Ueda |
| 2018/0159991 A1 | 6/2018 | Kiyose |
| 2018/0262492 A1 | 9/2018 | Daniel |
| 2019/0028610 A1 | 1/2019 | Sikkannan |
| 2019/0042774 A1 | 2/2019 | Claibome |
| 2019/0044630 A1 | 2/2019 | Ferreira |
| 2019/0253401 A1 | 8/2019 | Asakura |
| 2019/0306160 A1 | 10/2019 | Zehler |
| 2019/0370717 A1 | 12/2019 | Diaz |
| 2019/0373136 A1 | 12/2019 | Diaz |
| 2020/0293670 A1 | 9/2020 | Haapanen |

OTHER PUBLICATIONS

Haapanen, U.S. Appl. No. 16/354,872, filed Mar. 15, 2019, Final Office Action dated Apr. 20, 2020.

Haapanen, U.S. Appl. No. 16/354,872, filed Mar. 15, 2019, Office Action dated Aug. 28, 2020.

Haapanen, U.S. Appl. No. 16/354,872, filed Mar. 15, 2019, Advisory Action dated Jun. 30, 2020.

Nuggehalli, U.S. Appl. No. 16/798,981, filed Feb. 24, 2020, Office Action, dated Apr. 1, 2021.

Haapanen, U.S. Appl. No. 16/354,872, filed Mar. 15, 2019, Final Office Action, dated Feb. 4, 2021.

\* cited by examiner

Printing Device Group Data 222

| Printing Device Group ID | Printing Devices | Email Address | Other Information |
|---|---|---|---|
| PDG1 | PD1, PD2, PD3 | Print.GroupA@printcloud.com | Acme Corp. |
| PDG2 | PD4, PD5 | Print.GroupB@printcloud.com | Coyote Inc. - East wing |
| PDG3 | PD6, PD7, PD8 | Print.GroupC@printcloud.com | Coyote Inc. - West wing |
| PDG4 | PD9 | Print.GroupD@printcloud.com | Main Street Inc. |

Print Job Data 224

| Release Code | Printing Device Group ID | Print Data |
|---|---|---|
| RC1 | PDG1 | PD1 |
| RC2 | PDG2 | PD2 |
| RC3 | PDG3 | PD3 |
| RC4 | PDG2 | PD4 |

SECURE MOBILE CLOUD PRINTING USING PRINTING DEVICE GROUPS

RELATED APPLICATION DATA

This application is related to U.S. patent application Ser. No. 16/354,872 entitled "TWO-PHASE AUTHENTICATION FOR MOBILE DEVICE ACCESS TO PRINTING DEVICES", filed Mar. 15, 2019, the contents all of which are incorporated by reference in their entirety for all purposes as if fully set forth herein.

FIELD

The technical field of the present disclosure relates to cloud printing and more specifically, secure cloud printing from mobile devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

The widespread use of mobile devices, such as smartphones, creates a need for users to print from their mobile device. For example, users may wish to print emails and email attachments, such as documents and images, from their mobile phone to a nearby printing device. One conventional approach for printing from mobile devices is to install, on the user's mobile device, a print driver for each printing device that the user wants to use. The print driver enables the user's mobile device to generate print data, i.e., a print job, in the format required by a particular printing device. While this approach may be suitable for users wanting to print at familiar printing devices, for example at home or work, it is less suitable for printing at other locations where the user's mobile device does not have the required print driver.

An alternative to the driver-based approach is "driverless" cloud printing, in which the user's mobile device sends information to be printed, such as emails, documents, etc., to a cloud print server. The cloud print server formats the information into a printable format to create a print job and provides a release code back to the user's mobile device. The user enters the release code into a cloud print application on a printing device. The cloud print application provides the release code to the cloud print server, which provides the print job back to the printing device for printing.

While the cloud printing approach avoids the technical problem of a mobile device not having a required print driver installed, it allows unauthorized third parties to print information on virtually any printing device that has Internet connectivity, so long as the printing device is configured for cloud printing and the unauthorized third party knows the release code. This is problematic for business organizations that, for security reasons, want to restrict employees printing to printing devices within control of the business organizations. For example, a business organization may have a security policy that requires confidential information be printed only on the printing devices within the control of the business organization to prevent unauthorized parties from printing the confidential information. Individuals may also want to restrict printing of personal or confidential information to printing devices within their control. Therefore, there is a need for a technical solution to the problem of how to securely print from mobile devices that avoids the limitations of prior solutions.

SUMMARY

A computing device comprises one or more processors, one or more memories, and a display, a communications interface, one or more processors, one or more memories, and a cloud print server process executing on the computing device and being configured to receive, from a printing device, a request for a print job, wherein the request for the print job specifies a release code. The cloud print server process identifies a print job that uniquely corresponds to the release code and determines a printing device group assigned to the print job. The cloud print server process then determines whether the printing device is included in the printing device group assigned to the print job. In response to identifying a print job that uniquely corresponds to the release code, determining a printing device group assigned to the print job, and determining that the printing device is included in the printing device group that corresponds to the print job, the cloud print server process causes the print job to be transmitted to the printing device for printing.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Printing Device Architecture
 A. Mobile Device
 B. Email Service
 C. Print Cloud Server
 D. Information Converter
 E. Printing Device Groups
III. Securely Printing Information From Mobile Devices
 A. Creating Secure Print Cloud Jobs
 B. Printing Secure Print Cloud Jobs
IV. Implementation Examples

I. Overview

An approach is provided for securely printing information using a mobile device. The mobile device generates and transmits to a print cloud server application via email, a print cloud request that specifies information to be printed. The print cloud server application generates a print job and assigns the print job to a printing device group that corresponds to the destination email address of the print cloud request. The print cloud server application also generates and returns to the mobile device, a release code that the user of the device can use to print the information on printing devices that are in the same printing device group as the print job.

A user enters the release code at a printing device and the printing device generates and transmits, to the print cloud server application, a request for a print job. The request for a print job includes the release code and data that identifies the printing device group to which the printing device belongs. Upon receiving the request, the print cloud server application identifies a print job that corresponds to the release code and a printing device group that corresponds to the print job. The print cloud server application determines whether the printing device is in the same printing device group specified for the print job and if so, then the print cloud server application transmits the print job to the printing device for printing.

This approach provides a technical solution to the technical problem of how to securely print information from mobile devices. The technical solution controls the printing of print jobs using both a release code and a printing device group, so that a target printing device must both have the correct release code and be in the same printing device group as the print job to be given the print job for printing. This prevents a print job from being printed on a printing device that does not have the correct release code or is not in the printing device group for the print job.

II. Printing Device Architecture

Figure 1:
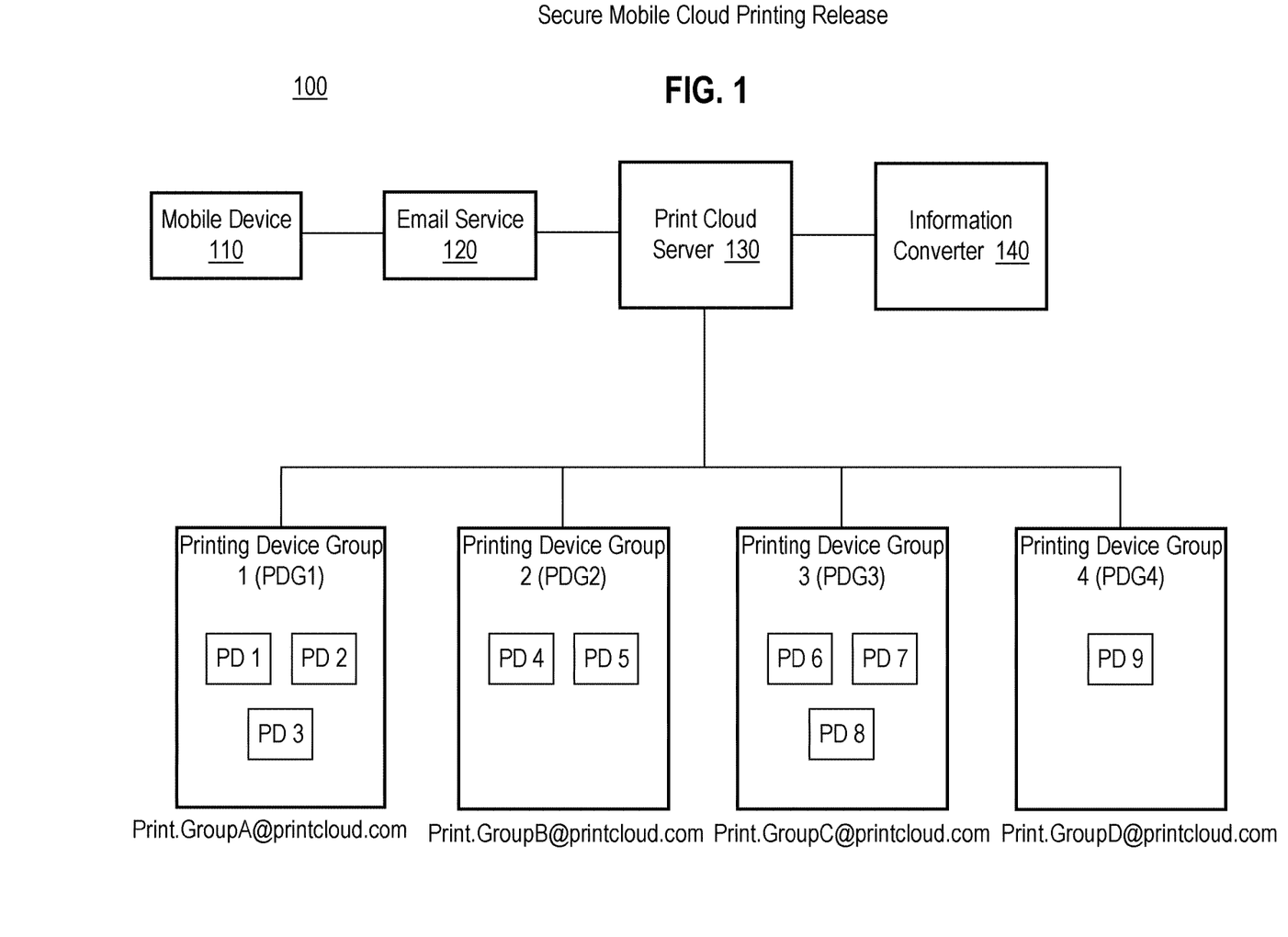
FIG. 1 is a block diagram that depicts a printing device arrangement.

FIG. 1 is a block diagram that depicts a printing device arrangement 100. Arrangement 100 includes a mobile device 110, an email service 120, a print cloud server 130, an information converter 140, and printing device groups PDG1, PDG2, PDG3, and PDG4. The elements of FIG. 1 may be communicatively coupled via one or more wireless and/or wired computer networks of any type, and/or direct communications links that are not depicted in FIG. 1 for purposes of explanation. Arrangement 100 may include additional or fewer elements, depending upon a particular implementation.

A. Mobile Device

The mobile device 110 may be implemented by any type of mobile computing device. Examples include, without limitation, a laptop computer, a personal digital assistant, a smart phone, etc. The mobile device 110 is configured to allow a user to perform driverless cloud printing with secure release using printing device groups that have corresponding email addresses, as described in more detail hereinafter. Although embodiments are described herein in the context of a single mobile device 110, embodiments are applicable to the arrangement 100 having any number of mobile devices. The mobile device 110 may be configured with email client functionality to enable the mobile device 110 to generate and transmit print job requests to the print cloud server 130 via email. For example, email client functionality may be provided by an email client or embedded into a process or application executing on the mobile device 110.

B. Email Service

The email service 120 delivers email to the print cloud server 130 and may be implemented by any type of email delivery service. The email service 120 delivers email from any source to the print cloud server 130 and may include other services such as transactional email services.

C. Print Cloud Server

Figure 2:
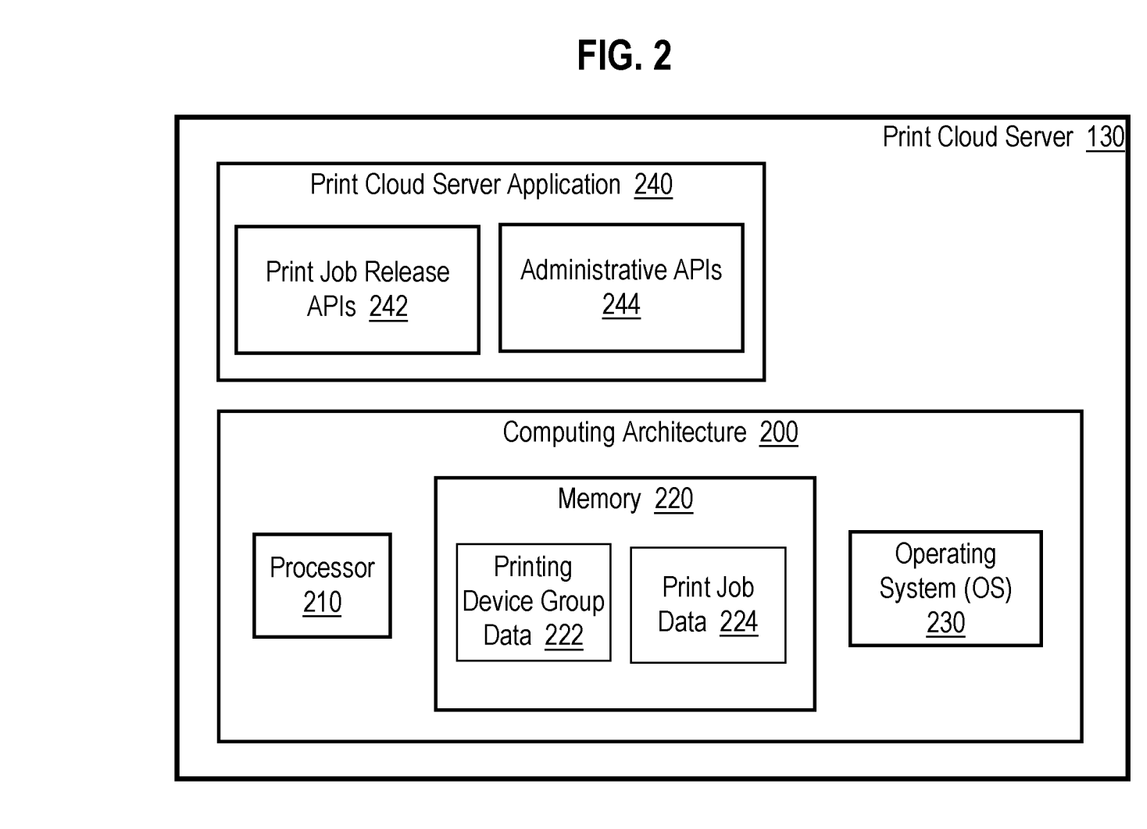
FIG. 2 is a block diagram that depicts an example implementation of a print cloud server.

The print cloud server 130 provides cloud printing with secure release using release codes and printing device groups. FIG. 2 is a block diagram that depicts an example implementation of the print cloud server 130 and includes a computing architecture 200 and a print cloud server application 240. The print cloud server 130 may include fewer or additional elements that may vary depending upon a particular implementation.

The computing architecture 200 includes a processor 210, a memory 220, and an Operating System (OS) 230. The computing architecture 200 may include fewer or additional elements that may vary depending upon a particular implementation. The processor 210 may be implemented by one or more microprocessors and associated computer hardware and/or computer software. The memory 220 may be implemented by volatile memory, non-volatile memory, or any combination of volatile and non-volatile memory. The OS 230 may be implemented by any type of operating system that may vary depending upon a particular implementation.

The print cloud server application 240 supports cloud printing with secure release using release codes and printing device groups, as described in more detail hereinafter. The print cloud server application 240 may support one or more Application Program Interfaces (APIs) that include functionality for printing devices to request print jobs for printing. According to an embodiment, the print cloud server application 240 supports print job release APIs 242 and administrative APIs 244. The print job release APIs 242 define functionality for requesting print jobs. For example, the print job release APIs 242 may define a function for requesting a print job, where the function requires a release code that corresponds to a particular print job. According to an embodiment, the print job release APIs 242 define a function for requesting a print job, where the function requires as inputs, both a release code and data that specifies a printing device group, such as a printing device group identifier (ID). The administrative APIs 244 define one or more administrative functions for the print cloud server 130, for example, for managing printing device groups and print jobs, as described in more detail hereinafter. The print cloud server application 240 is configured to generate a release code for a print job.

D. Information Converter

The information converter 140 processes information into a printable format. For example, the information converter 140 may convert emails (text, html, etc.) and attachments into a printable format such as the Portable Document Format (PDF). The information converter 140 may be implemented as a stand-alone process that processes requests to convert information from the print cloud server 130. Alternatively, the functionality of the information converter 140 may be implemented on the print cloud server 130. Converting information into a printable format, such as PDF, allows information to be printed using the mobile device 110, even though the mobile device 110 does not have a print driver required by a target printing device. Further, the mobile device 110 does not even need to know the identity of the target printing device at the time that information is transmitted to the print cloud server 130 for printing.

E. Printing Device Groups

Printing device groups are logical groups of printing devices. Printing devices may be grouped for a wide variety of reasons. For example, a printing device group may include all of the printing devices of a business organization. As another example, a printing device group may include printing devices of a particular location, division, group, department, project, etc., within an organization. Printing device groups may have any number of printing devices of the same or different types.

The arrangement 100 of FIG. 1 includes four printing device groups identified as PDG1-PDG4. PDG1 includes three printing devices identified as PD1, PD2, and PD3. PDG2 includes two printing devices PD4 and PD5. PDG3 includes three printing devices PD6, PD7, PD8, and PDG4 includes one printing device PD9.

Figure 3:
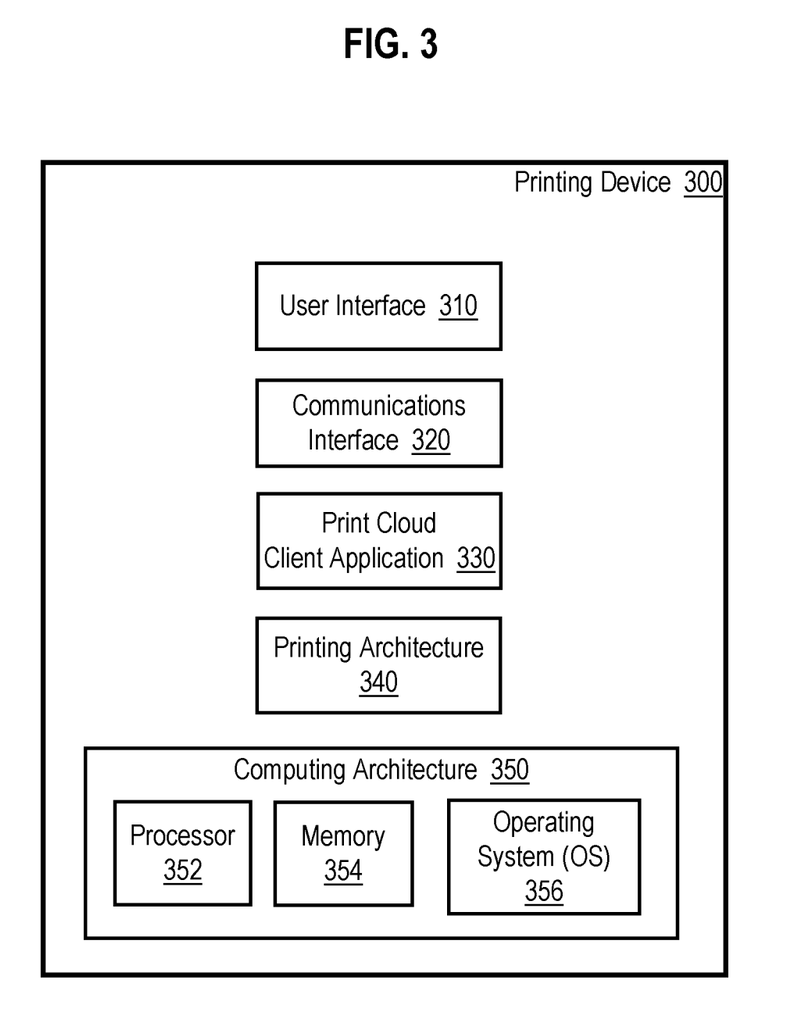
FIG. 3 is a block diagram that depicts an example implementation of a printing device.

FIG. 3 is a block diagram that depicts an example implementation of a printing device 300 that includes a user interface 310, a communications interface 320, a print cloud client application 330, a printing architecture 340, and a computing architecture 350. The user interface 310 allows a user to input information to the printing device 300 and/or displays information to the user. For example, the user interface 310 may be implemented by a display screen, a control panel, a keyboard, a pointing device such as a mouse, or any combination thereof. The user interface 310 may include graphical user interface controls displayed on a touch screen that convey information a user about the functionality and status of the printing device and also allow a user to select functions and input information to the printing device 300.

The communications interface 320 provides for the exchange of data between the printing device 300 and other computing elements via wired, wireless, or direct connections. The print cloud client application 330 communicates with the print cloud server application 240 to request print jobs using a release code and data that identifies a printing device group, as described in more detail hereinafter. The print cloud client application 330 may implement one or more APIs supported by the print cloud server application 240. The print cloud client application 330 may be implemented by one or more computer-implemented processes of any type. Furthermore, although depicted as a separate element for discussion purposes, the functionality provided by the print cloud client application 330 may be integrated into other processes and/or elements on printing device 300.

The printing architecture 340 includes hardware elements, software elements, or any combination of hardware and software elements for printing electronic documents. This may include, for example, a paper transport, logic circuits, a toner cartridge, a photosensitive drum, a laser, one or more coronas, a fuser, an erase lamp, power supply, etc.

The computing architecture 350 includes a processor 352, a memory 354, and an OS 356. The processor 352 may be implemented by one or more microprocessors and associated computer hardware and/or computer software. The memory 354 may be implemented by volatile memory, non-volatile memory, or any combination of volatile and non-volatile memory. The OS 356 may be implemented by any type of operating system that may vary depending upon a particular implementation. According to an embodiment, the printing device 300 includes the capability to print information and print jobs received from the print cloud server application 240. For example, the printing device 300 may include the capability to print PDF documents.

Figure 4A:
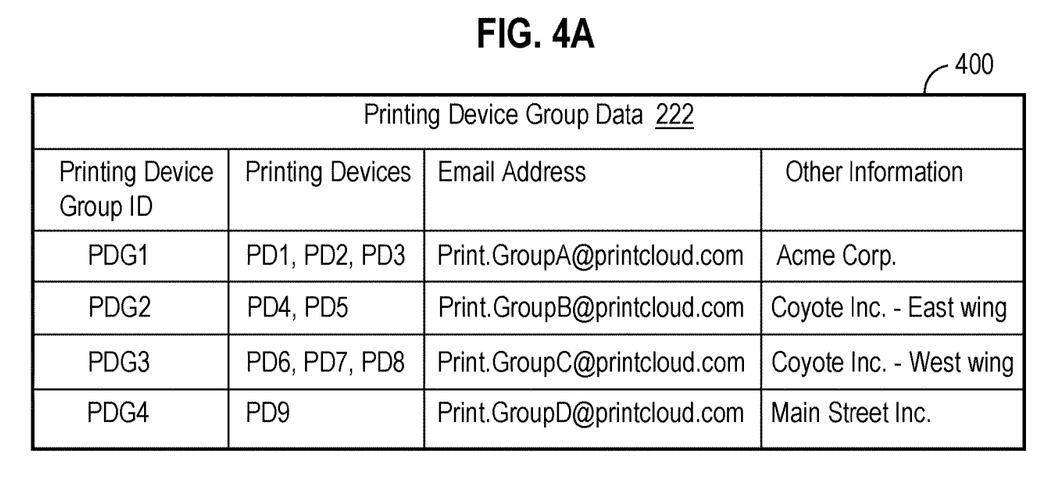
FIG. 4A depicts a table of printing device group data.

Referring to FIG. 2, according to an embodiment, the print cloud server application 240 maintains, in the memory 220, printing device group data 222 and print job data 224. The printing device group data 222 defines printing device groups and FIG. 4A depicts a table 400 of example printing device group data 222. Each row of table 400 corresponds to a particular printing device group and specifies a printing device group ID, the printing devices included in the printing device group, an email address for the printing device group, and other information about the printing device group.

The printing device group ID may be any data that unique identifies the printing device group. One example of a printing device group ID is an alphanumeric string. The printing devices included in a printing device group may be identified, for example, by printing device IDs. The email address is a unique email address that corresponds to the printing device group and is used by client devices, such as the mobile device 110, to specify the group of printing devices on which information, such as an email, email attachments such as documents, etc., are to be printed. The email addresses depicted in the table 400 are examples and embodiments are not limited to these examples. The usernames may have a different format for different printing device groups and may be more specific than the examples depicted in the table 400. In addition, the domain name may be different for different printing device groups. The other information may be any information about a printing device group, such as the name of a business organization, a location, department, project, team, etc., within a business organization, etc.

According to an embodiment, the print cloud server application 240 provides an administrative user interface that allows a user to manage computing device groups including, for example, creating, modifying, and deleting computing device groups. The administrative user interface may be implemented as a Web-based user interface and defined by the administrative APIs 244. According to an embodiment, the administrative user interface includes a login page that prompts a user for user credentials and the print cloud server application 240 verifies the user credentials. After successfully verifying the user credentials, the user is presented with user interface controls that allow a user to view their current printing device groups, create new printing device groups, edit existing printing device groups, and delete printing device groups. Editing existing printing device groups includes adding, editing, or deleting information for printing device groups, such as the information included in printing device group data 222. The user interface controls may also allow a user to name each printing device group. This may be useful for organizations that have multiple printing device groups. The printing device group data 222 is updated in response to changes to printing device groups.

Figure 4B:
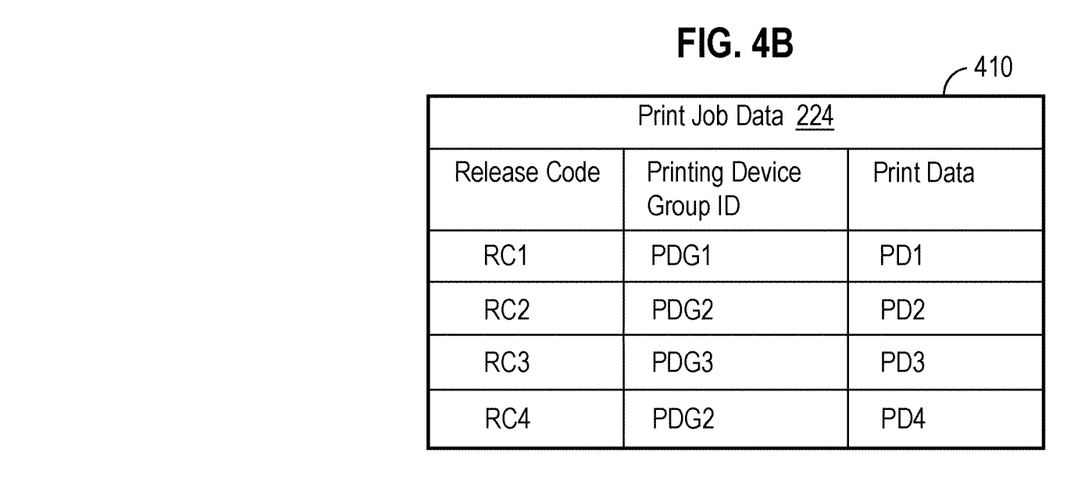
FIG. 4B depicts a table of print job data.

The print job data 224 defines print jobs. FIG. 4B depicts a table 410 of print job data 224. Each row of table 410 corresponds to a particular print job and includes a release code, a printing device group ID, and print data. The release code may be any data that uniquely identifies the print job. One example of a release code is an alphanumeric string. The printing device group ID specifies the printing device group to which the print job is assigned. The print data is the printable data generated by the information converter. Examples of printable data include an email and email attachments, such as documents.

III. Securely Printing Information from Mobile Devices

Securely printing information from mobile devices involves two phases that include: 1) creating a secure print cloud job; and 2) retrieving and printing a secure print cloud job. Each of these phases is discussed hereinafter.

A. Creating Secure Print Cloud Jobs

Figure 5A:
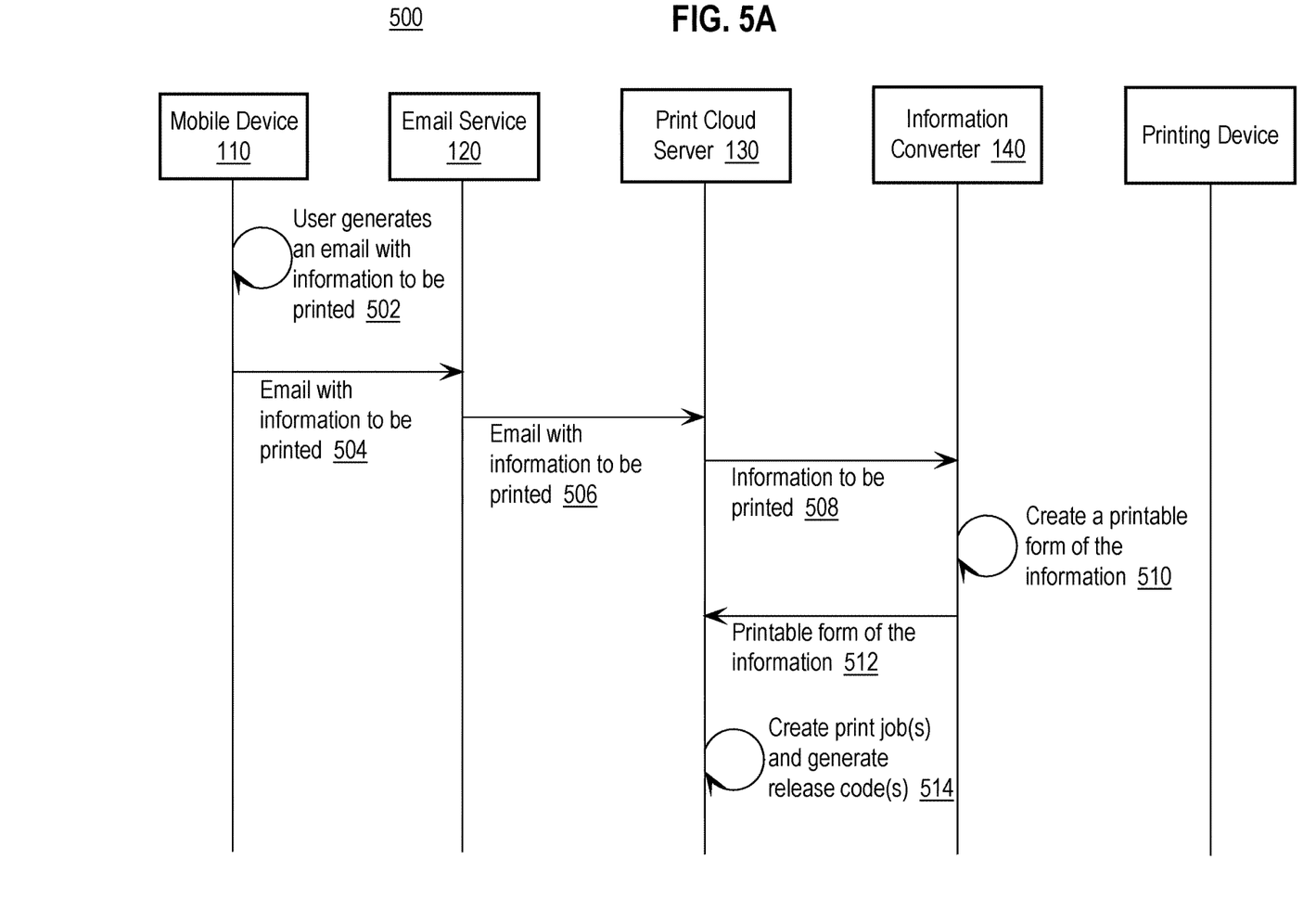
FIG. 5A is a message ladder diagram that depicts messages exchanged during the creation of a secure print cloud job.

FIG. 5A is a message ladder diagram 500 that depicts messages exchanged between the elements in arrangement 100 during the creation of a secure print cloud job. Starting in step 502, a user generates an email with information to be printed. For example, a user of the mobile device 110 uses an email client to generate an email and optionally attaches one or more documents to be printed. In this example, the information to be printed may include text contained in the email, the one or more attachments, or both the text contained in the email and the one or more attachments.

In step 504, the email with information to be printed is sent to an email address that corresponds to a target printing device group at which the information will be printed. For example, referring to the printing device group data 222 that specifies the email address for each printing device group, the user of the mobile device 110 may address the email to "Print.GroupA@printcloud.com" to print the information at any of the printing devices in Printing Device Group 1, i.e., at printing device PD1, PD2, and/or PD3. Similarly, the user of the mobile device 110 may address the email to "Print.GroupB@printcloud.com" to print the information at any of the printing devices in Printing Device Group 2, i.e., at printing device PD4 and/or PD5.

In the example arrangement 100 depicted in FIG. 1, the email is received by the email service 120 and in step 506, the email service 120 transmits the email to the print cloud server 130.

In step 508, the print cloud server application 240 on the print cloud server 130 transmits the information to be printed to the information converter 140 to be converted into a printable format. This may include the print cloud server application 240 removing text from the received email and providing the removed text and attachments to the information converter 140.

In step 510, the information converter 140 generates a printable form of the information to be printed. For example, the information converter 140 may convert the email text and attachments to a format such as PDF. In step 512, the information converter 140 provides the printable form of the email text and attachments back to the print cloud server application 240.

In step 514, the print cloud server application 240 generates one or more print jobs based upon the printable form of the email text and attachments. This includes generating a release code, assigning a printing device group to each printable item, and updating the print job data 224. The release code may be, for example, a randomly generated number or an alphanumeric string.

According to an embodiment, the printing device group is determined based upon the destination address of the email. For example, suppose that the mobile device 110 sent the email to "Print.GroupA@printcloud.com." The print cloud server application 240 uses the email address and the printing device group data 222 to determine that the printing device group PDG1 is to be assigned to the information to be printed, i.e., to the email text and each of the attachments. The print cloud server application 240 generates a different release code for the printable form of the email text and each of the attachments, but the print cloud server application 240 assigns the same printing device group to the email text and each of the attachments, since they were generated based upon the same email from the mobile device 110. Alternatively, one release code may be used for all of the information to be printed, i.e., the text of the email and the attachments.

B. Printing Secure Print Cloud Jobs

The print cloud server application 240 is configured to control the release of print jobs to printers using both a release code that uniquely identifies a print job and a printing device group assigned to the print job. More specifically, the print cloud server application 240 releases print job only to printing devices that are in the same printing device group as the printing device group assigned to the print job.

Figure 5B:
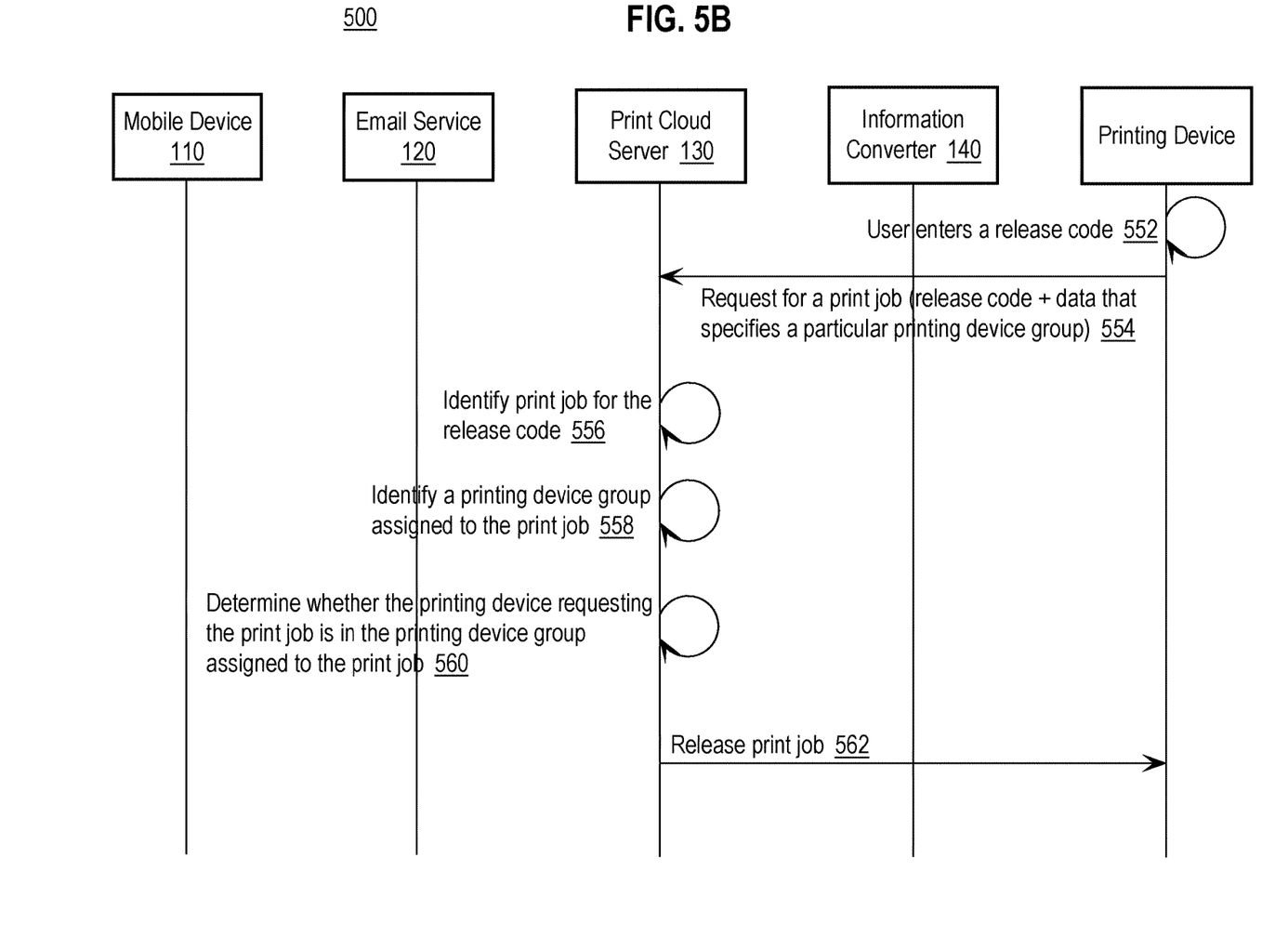
FIG. 5B is a message ladder diagram that depicts messages exchanged during the release and printing of a secure print cloud job.

FIG. 5B is a message ladder diagram 500 that depicts messages exchanged between the elements in arrangement 100 during the release and printing of a secure print cloud job. Starting in step 552, a user enters a release code at a printing device. For example, a user enters a release code via the user interface 310 of the printing device 300.

In step 554, the printing device generates and transmits to the print cloud server 130 a request for a print job. For example, the print cloud client application 330 generates a request for a print job that complies with the print job release APIs 242 of the print cloud server application 240 and includes both the release code provided by the user of the printing device and data that specifies a particular printing device group, such as a printing device group ID. The printing device may be configured with the printing device group ID. For example, during installation, the print cloud client application 330 may be configured with the printing device ID of the printing device group to which the printing device belongs. This may be performed, for example, by an administrative user when the print cloud client application 330 is installed on the printing device 300.

In step 556, the print cloud server 130 receives the request for a print job from the printing device and identifies a print job for the release code. For example, the print cloud server application 240 extracts the release code from the request and then, using print job data 224, identifies a print job that corresponds to the release code. Suppose that the release code specified by the request is "RC3." The print cloud server application 240 compares the release code "RC3" to the release codes contained in the print job data 224 to determine that the print job represented by the data in the third row of the print job data 224 corresponds to the release code "RC3." In the event that the print cloud server application 240 does not find the release code in the print job data 224, then the print cloud server application 240 generates and transmits to the printing device data that indicates an error has occurred because no print job could be found that corresponds to the release code specified in the request.

In step 558, a printing group that is assigned to the print job is identified. For example, the print cloud server application 240 identifies the printing group ID for the print job based upon the data contained in print job data 224. In the present example, the print cloud server 130 determines that the printing device group ID is "PDG3" for the print job with the release code "RC3."

In step 560, a determination is made whether the printing device that requested the print job for printing is in the same printing device group as the print job. For example, the print cloud server application 240 determines whether the printing device that requested the print job is in the printing device group "PDG3" that was assigned to the print job. The print cloud server application 240 may make this determination by using the printing device group data 222 to determine the printing device group ID to which the printing device belongs. The print cloud server application 240 then compares the printing device group ID for the printing device to the printing device group ID for the print job. For example, if the printing device is PD6, PD7, or PD8, then the printing device is assigned to the printing device group having a printing device group ID of "PDG3," which is the same as the printing device group assigned to the print job. In response to determining that the printing device group for the printing device and the print job are the same, in step 562 the print job is released to the printing device. If, on the other hand, a determination is made that the printing device group for the printing device and the print job are not the same, then the print job is not released to the printing device. In addition, an error message may be provided to the printing device to indicate that the printing device is not authorized to print the print job. For example, the printing device 300 may display a message via the user interface 310 visually indicate to the user of the printing device 300 that the printing device 300 is not authorized to print the print job, is not in the same printing device group as the print job, etc.

Although embodiments are described herein in the context of a print jobs being assigned to a single printing device group, embodiments are not limited to these examples and print jobs may be assigned to multiple printing device groups. For example, when creating a print cloud job as previously described herein with respect to FIG. 5A, the user may send information to be printed via email to multiple email addresses. In step 514 when the print cloud server application 240 generates the print jobs and the release codes and assigns the printing device group, the print cloud server application 240 assigns multiple printing device groups to the print job, where each printing device group corresponds to a destination email address to which the email was sent. The print job data 224 is updated to include multiple printing device group IDs for each print job.

When a request to print a print job from a printing device is received and processed as previously described herein with respect to FIG. 5B, the requested print job is released to the printing device if the printing device is in any of the printing device groups assigned to the print job based upon the destination addresses of the email. This provides greater flexibility for users because it allows them to increase the number of printing devices from which they can print information. For example, a user might send an email request to both an email address that corresponds to a first printing device group of printing devices in a first physical location and a second printing device group of printing devices in a second physical location to allow the user to print at either the first physical location or the second physical location.

Printing devices may also correspond to multiple printing device groups. For example, a printing device may be assigned to two departments within an organization, or a project and team within an organization, etc., e.g., in a sharing arrangement. This may be accomplished by the administrative user configuring the print cloud client application 330 to assign the printing device 300 to both printing device groups. The printing device group data 222 is updated to specify the assignment of the printing device 300 to both printing device groups. For example, the printing device ID for the printing device is added to two rows of the printing device group data 222. In step 560 of FIG. 5B, the print cloud client application 330 compares both printing device group IDs for the printing device to the printing device group ID for the print job to determine whether the print job should be released to the printing device.

Although embodiments are described herein in the context of a printing device providing both a release code and data that identifies a printing device group to the print cloud server 130 when requesting a print job, embodiments are not limited to these examples. The approaches described herein are applicable to embodiments where the print cloud server application 240 can determine the printing device group of the requesting printing device, even though the printing device group is not explicitly identified in the request from the printing device. This may be accomplished, for example, by the print cloud server application 240 identifying the printing device. Once the printing device has been identified, then the print cloud server application 240 determines the printing device group for the printing device.

V. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
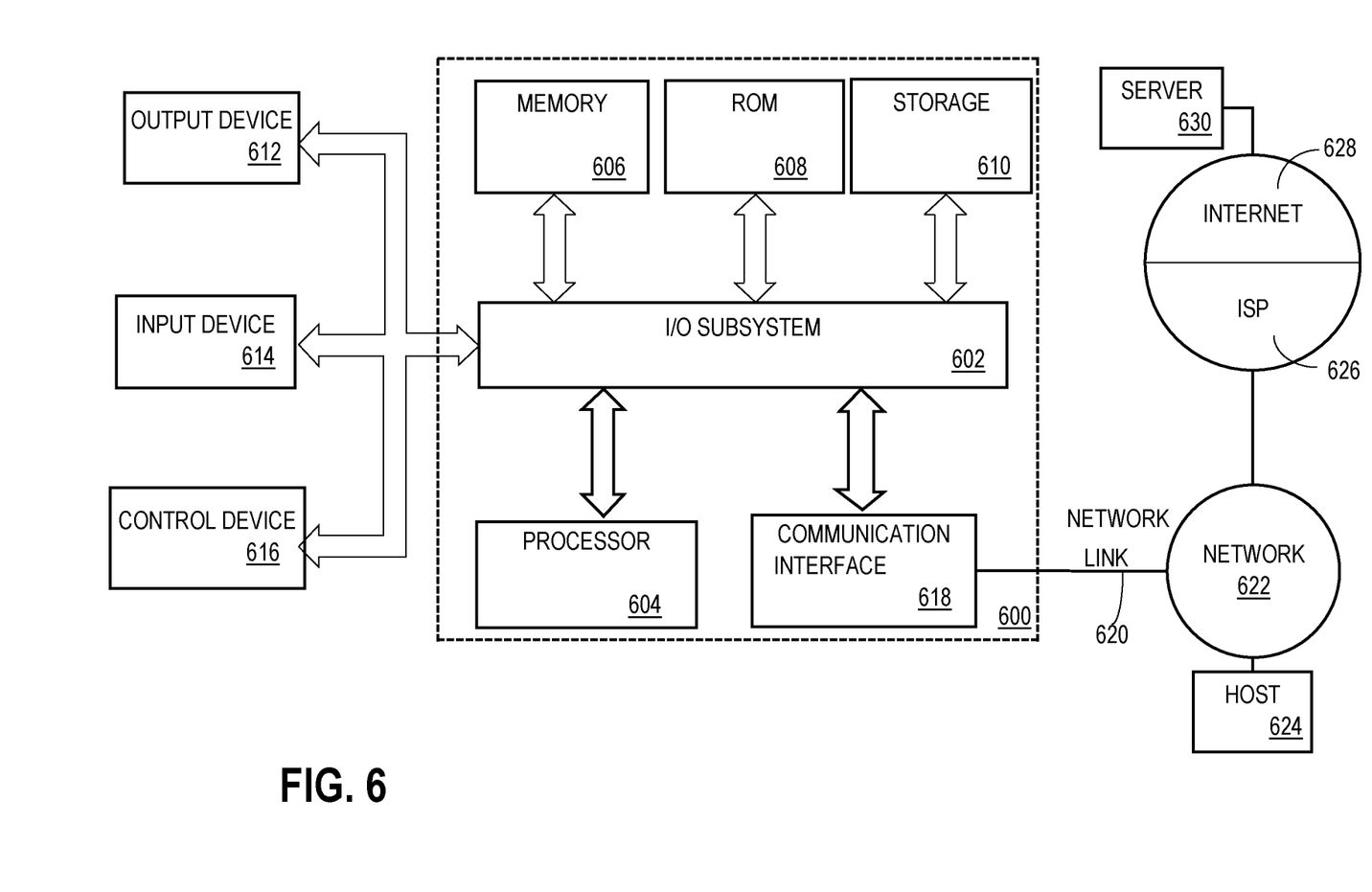
FIG. 6 is a block diagram that depicts an example computer system upon which embodiments may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A computing device comprising:
one or more processors;
one or more memories; and
a cloud print server process executing on the computing device and being configured to:
receive, from a printing device, a request for a print job, wherein the request for the print job specifies a release code that was input by a user at the printing device,
identify a print job that uniquely corresponds to the release code,
determine a printing device group assigned to the print job,
determine whether the printing device from which the cloud print server process received the request for the print job is included in the printing device group assigned to the print job,
in response to identifying a print job that uniquely corresponds to the release code that was input by the user at the printing device and received by the cloud print server process from the printing device in the request for the print job, determining a printing device group assigned to the print job, and determining that the printing device from which the cloud print server process received the request for the print job is included in the printing device group that corresponds to the print job, causing the print job to be transmitted to the printing device for printing.

2. The computing device as recited in claim 1, wherein:
the request for a print job received by the cloud print server process from the printing device specifies a particular printing device group, and
the cloud print server process is further configured to determine whether the printing device is included in the printing device group assigned to the print job by comparing the particular printing device group specified by the request for a print job to the printing device group assigned to the print job.

3. The computing device as recited in claim 1, wherein the cloud print server process is further configured to:
receive, from a mobile device, an email request to print information, and
assign the printing device group to the print job based upon the destination email address of the email request to print information.

4. The computing device as recited in claim 3, wherein the cloud print server process is further configured to generate the release code for the print job.

5. The computing device as recited in claim 1, wherein the cloud print server process supports an administrative user interface that includes functionality for users to create, edit, and delete printing device groups.

6. The computing device as recited in claim 1, wherein the cloud print server process supports an Application Program Interface (API) that provides access to first functionality for retrieving print jobs, and the API specifies that a first type of request for retrieving a print job, included in the first functionality for retrieving print jobs, specifies at least a release code and data that identifies a printing group.

7. The computing device as recited in claim 6, wherein the API provides access to second functionality for retrieving print jobs, and the API specifies that a second type of request for retrieving a print job, included in the second functionality for retrieving print jobs, specifies at least a release code.

8. The computing device as recited in claim 1, wherein the cloud print server process is configured to generate the print job by providing information to be printed to an information converter and receiving printable information from the information converter.

9. One or more non-transitory computer-readable media storing instructions which, when processed by one or more processors, cause:
receiving, by a cloud print server process executing on a computing device from a printing device, a request for a print job, wherein the request for the print job specifies a release code that was input by a user at the printing device,
identifying, by the cloud print server process, a print job that uniquely corresponds to the release code,
determining, by the cloud print server process, a printing device group assigned to the print job,
determining, by the cloud print server process, whether the printing device from which the cloud print server process received the request for the print job is included in the printing device group assigned to the print job, in response to identifying a print job that uniquely corresponds to the release code that was input by the user at the printing device and received by the cloud print server process from the printing device in the request for the print job, determining, by the cloud print server process, a printing device group assigned to the print job, and determining that the printing device from which the cloud print server process received the request for the print job is included in the printing device group that corresponds to the print job, causing the print job to be transmitted to the printing device for printing.

10. The one or more non-transitory computer-readable media as recited in claim 9, wherein:
the request for a print job received by the cloud print server process from the printing device specifies a particular printing device group, and
the one or more non-transitory computer-readable media store additional instructions which, when processed by the one or more processors, cause determining, by the cloud print server process, whether the printing device is included in the printing device group assigned to the print job by comparing the particular printing device group specified by the request for a print job to the printing device group assigned to the print job.

11. The one or more non-transitory computer-readable media as recited in claim 9, wherein the one or more non-transitory computer-readable media store additional instructions which, when processed by the one or more processors, cause:
receiving, from a mobile device, an email request to print information, and
assigning the printing device group to the print job based upon the destination email address of the email request to print information.

12. The one or more non-transitory computer-readable media as recited in claim 11, wherein the one or more non-transitory computer-readable media store additional instructions which, when processed by the one or more processors, cause generating, by the cloud print server process, the release code for the print job.

13. The one or more non-transitory computer-readable media as recited in claim 9, wherein the cloud print server process supports an administrative user interface that includes functionality for users to create, edit, and delete printing device groups.

14. The one or more non-transitory computer-readable media as recited in claim 9, wherein the cloud print server process supports an Application Program Interface (API) that provides access to first functionality for retrieving print jobs, and the API specifies that a first type of request for retrieving a print job, included in the first functionality for retrieving print jobs, specifies at least a release code and data that identifies a printing group.

15. The one or more non-transitory computer-readable media as recited in claim 14, wherein the API provides access to second functionality for retrieving print jobs, and the API specifies that a second type of request for retrieving a print job, included in the second functionality for retrieving print jobs, specifies at least a release code.

16. The one or more non-transitory computer-readable media as recited in claim 9, wherein the one or more non-transitory computer-readable media store additional instructions which, when processed by the one or more processors, cause generating, by the cloud print server process, the print job by providing information to be printed to an information converter and receiving printable information from the information converter.

17. A computer-implemented method comprising:
receiving, by a cloud print server process executing on a computing device from a printing device, a request for a print job, wherein the request for the print job specifies a release code that was input by a user at the printing device,
identifying, by the cloud print server process, a print job that uniquely corresponds to the release code,
determining, by the cloud print server process, a printing device group assigned to the print job,
determining, by the cloud print server process, whether the printing device from which the cloud print server process received the request for the print job is included in the printing device group assigned to the print job,
in response to identifying a print job that uniquely corresponds to the release code that was input by the user at the printing device and received by the cloud print server process from the printing device in the request for the print job, determining, by the cloud print server process, a printing device group assigned to the print job, and determining that the printing device from which the cloud print server process received the request for the print job is included in the printing device group that corresponds to the print job, causing the print job to be transmitted to the printing device for printing.

18. The computer-implemented method as recited in claim 17, wherein:
the request for a print job received by the cloud print server process from the printing device specifies a particular printing device group, and
the computer-implemented method further comprises determining, by the cloud print server process, whether the printing device is included in the printing device group assigned to the print job by comparing the particular printing device group specified by the request for a print job to the printing device group assigned to the print job.

19. The computer-implemented method as recited in claim 17, further comprising:
receiving, from a mobile device, an email request to print information, and
assigning the printing device group to the print job based upon the destination email address of the email request to print information.

20. The computer-implemented method as recited in claim 19, further comprising generating, by the cloud print server process, the release code for the print job.

* * * * *